Feb. 20, 1934.   I. J. McCULLOUGH   1,947,726
CASING CUTTER
Filed May 18, 1931   2 Sheets-Sheet 1
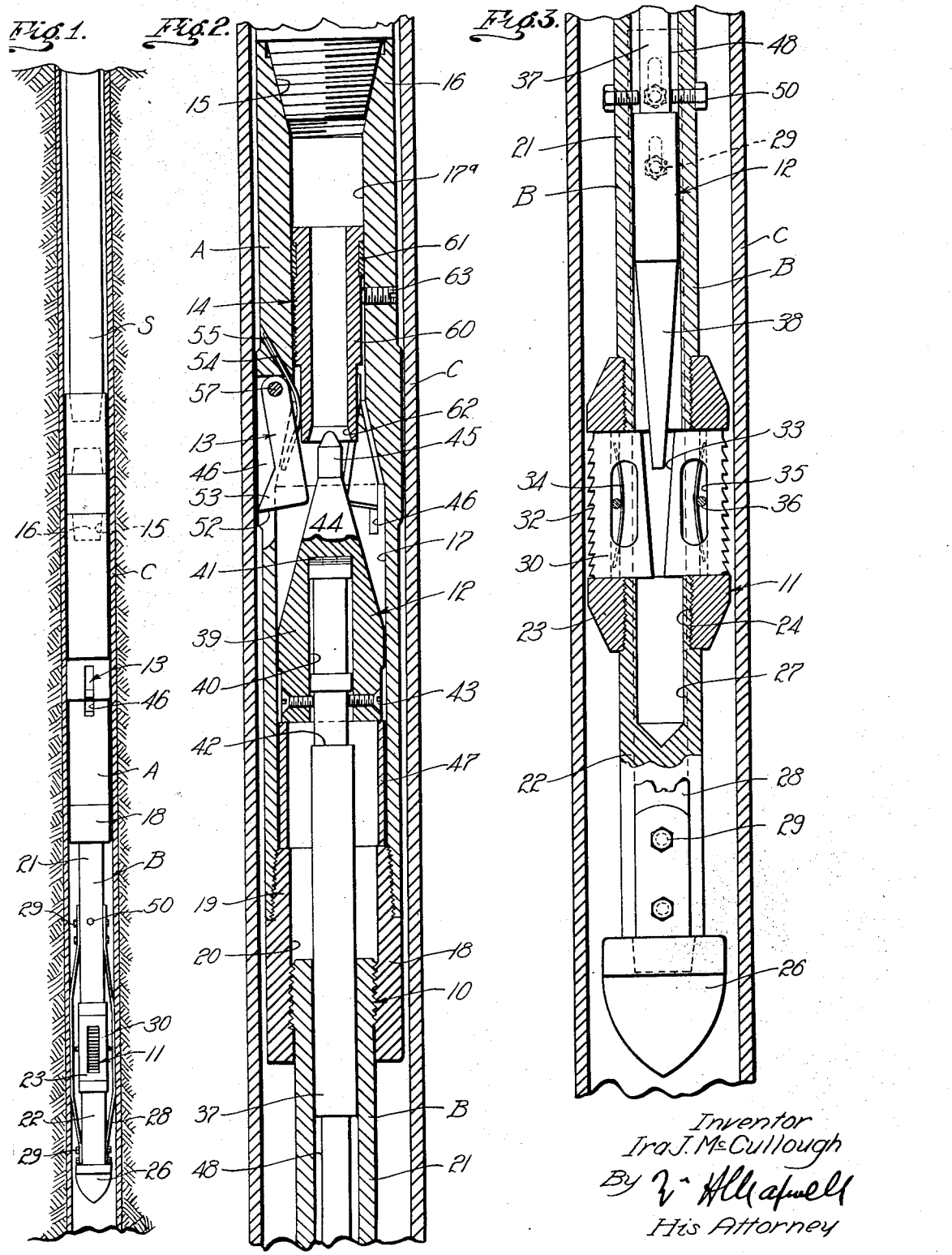
Inventor
Ira J. McCullough
By [signature]
His Attorney

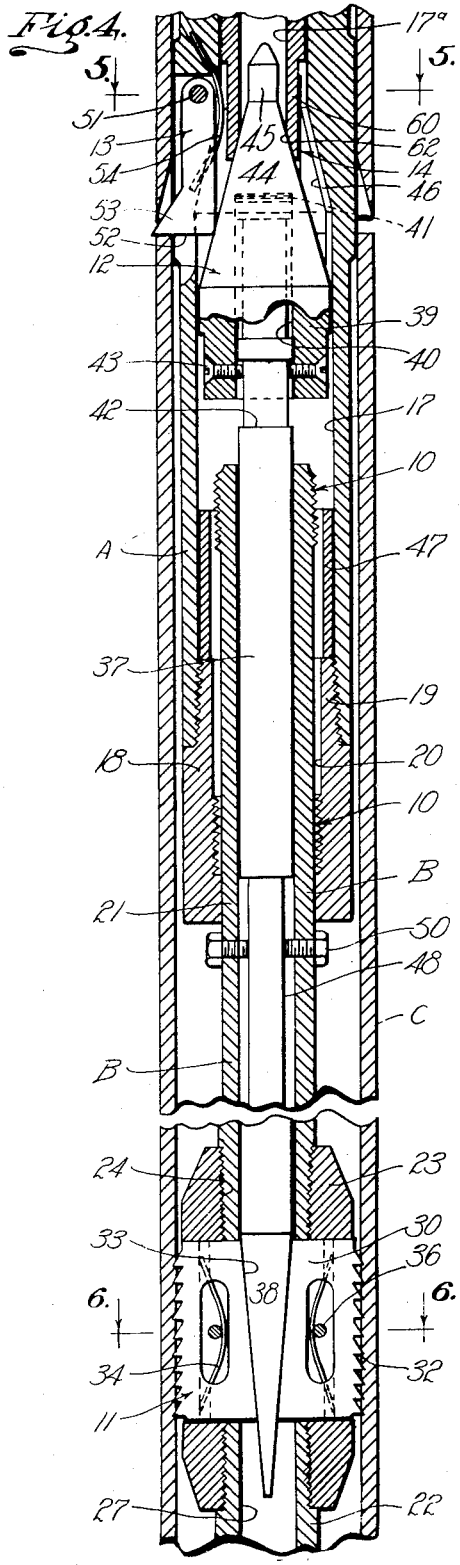
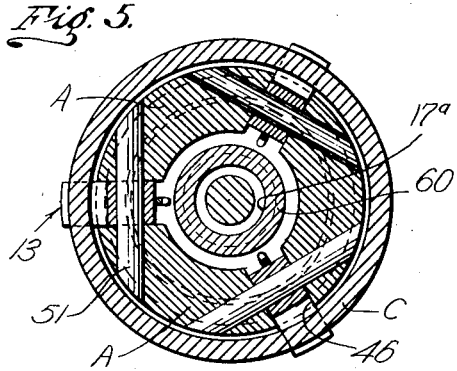
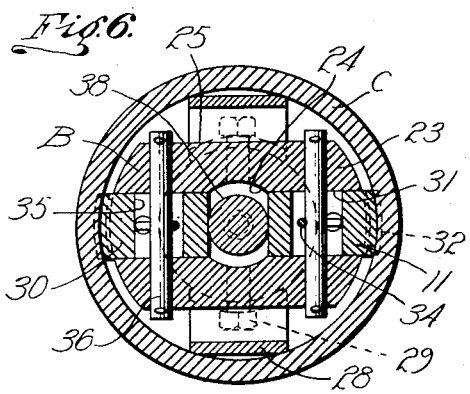
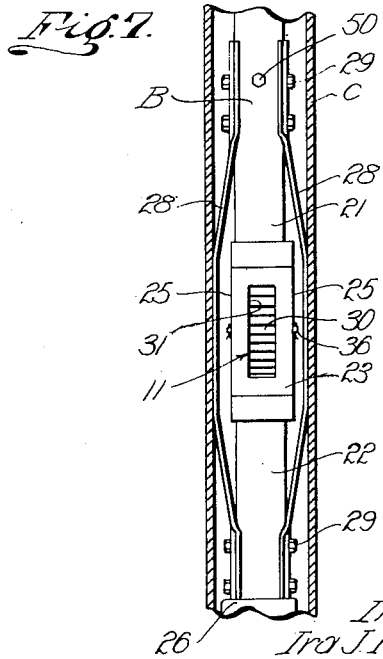

Patented Feb. 20, 1934

1,947,726

UNITED STATES PATENT OFFICE 1,947,726

CASING CUTTER

Ira J. McCullough, Huntington Park, Calif.

Application May 18, 1931. Serial No. 538,173

14 Claims. (Cl. 81—195)

This invention relates to a well tool, and relates more particularly to a casing cutter for cutting casing, tubing, etc., in a well. It is a general object of the invention to provide a casing cutter that is dependable and effective in operation and that is particularly simple and easy to operate.

An object of this invention is to provide a casing cutter that includes cutting means for cutting through casing or tubing and a means for indicating to the operator that the cutting means or parts have been actuated to their full out or operative positions.

It is another object of the invention to provide a casing cutter that includes cutters or knives operable to make a clean cut in the casing or tubing that is so shaped that the cutters are easily retractable after making the cut.

It is another object of the invention to provide a casing cutter that includes a casing gripping means for controlling the operation of the cutter that is actuated by fluid pressure. In accordance with the present invention, the pressure of the circulation fluid is employed to automatically operate the casing gripping means prior to actuation of the cutters and to maintain the gripping means in its proper engagement with the casing during operation of the cutters.

Another object of the invention is to provide a casing cutter of the character mentioned that is adjustable so that the cutting parts or knives may be made to cut casing or tubing of different diameters or of different wall thicknesses.

It is another object of the invention to provide a tool of the character mentioned that embodies means for cutting off the circulation of fluid through the operating string upon the knives reaching their fully actuated position to indicate to the operator that the cutters have been fully actuated.

A further object of the invention is to provide a casing cutter that may be easily moved through the casing after making a cut to a position to make another cut without difficult or extensive manipulation of the operating string.

Other objects and features of the invention will be best and more fully understood from the following detailed description of a typical form and application of the invention, throughout which description reference will be had to the accompanying drawings, in which:

Fig. 1 is a view showing the tool provided by the present invention within a well casing and carried on the lower end of an operating string. Fig. 2 is an enlarged longitudinal detailed sectional view of the upper portion of the casing cutter illustrating the parts in the unactuated position. Fig. 3 is an enlarged longitudinal detailed sectional view of the lower portion of the tool illustrating the parts in the unactuated position. Fig. 4 is an enlarged longitudinal detailed sectional view of the casing cutter illustrating the parts in the operating positions. Figs. 5 and 6 are enlarged transverse detailed sectional views taken as indicated by lines 5—5 and 6—6 on Fig. 4, and Fig. 7 is an enlarged side elevation of the lower end portion of the tool.

The tool provided by this invention includes, generally, two loosely or slackly connected sections A and B, a releasable connection 10 for normally holding the sections A and B against relative movement, casing gripping means 11 carried by one of the sections, a hydraulic or fluid pressure actuated means 12 for operating the gripping means 11 upon the release of the connection 10, cutters or knives 13 carried by the other section and operable outwardly into engagement with the casing C upon relative movement between the sections A and B, and means 14 for indicating to the operator that the cutters 13 have reached the fully actuated position.

The sections A and B constitute the main or body parts of the tool and are related for relative rotational and longitudinal movement. The sections A and B have portions telescoped or fitted one into the other, that is, the section B has a portion extending into the section A. The section A is the upper section of the tool, and is adapted to be attached to an operating string of drill pipe, while the section B is the lower section and extends into the lower end of the section A.

The body section A may be provided at its upper end with a socket 15 to receive the screw-threaded pin 16 of a tool joint section, or the like, on the lower end of the operating string S. The section A is tubular, being provided with a central longitudinal opening 17. In the preferred construction, the upper end portion 17ᵃ of the body opening is of reduced diameter. The walls of the opening between its main lower portion and the restricted portion 17ᵃ are inclined upwardly and inwardly. A tubular nut 18 is provided on the lower end of the section A. A pin 19 is provided on the nut 18 and is screw-threaded into the lower end of the section A. A longitudinal opening 20 is provided in the nut 18 to receive or pass the section B, as will be hereafter described. The nut 18 may be of the same external diameter as the body section A and may be of smaller internal diameter than the section A so that the upper end of the pin 19 forms an upwardly facing shoulder in the lower end of the body opening 17. The body section A is proportioned to pass into the casing C or through the tubing in which the tool is to operate with suitable clearance.

The section B is in the nature of an elongated mandrel or stem and is provided to carry the casing gripping means 11. The section B may be sectional and may include an upper member 21, a lower member 22, and a block 23 interposed between the members 21 and 22. In accordance with the invention, the upper member 21 is tubular and has its lower end attached to the block 23. The lower end of the upper member 21 is screw-threaded into a central longitudinal opening 24 in the block 23. The block 23 may be somewhat wider than the members 21 and 22 and may have two diametrically opposite parallel sides 25. The opening 24 extends completely through the block, and the upper end of the lower section 22 may be threaded into its lower end. The lower section 22 is an elongated cylindrical member and is provided at its lower end with a bull plug or guide plug 26. A vertical socket 27 is provided in the upper end of the lower member 22 to form a continuation of the block opening 24.

Means is provided on the lower section B to resist movement relative to the casing C. The means for resisting movement of the section B through the casing is in the nature of a spring means including longitudinally disposed leaf springs 28. The springs 28 may be arranged at diametrically opposite sides of the section B and may have their upper ends attached to the upper member 21 and their lower ends attached to the lower member 22. Suitable screws 29 may be employed to attach the springs 28 to the section B. The springs 28 are bowed outwardly around the block 23 and their intermediate portions are adapted to pressurally engage the interior of the casing C.

The releasable connection 10 is provided to hold the sections A and B against relative movement in positions where the operating parts are in their unactuated positions. The connection 10 is in the nature of a screw-threaded connection that is releasable by relative rotation between the sections A and B. The screw-threaded connection 10 is provided between the nut 18 and the member 21 and includes a thread on the upper end of the member 21 to co-operate with a thread on the walls of the nut opening 20. The connection 10 is adapted to be released upon rotation of the section A relative to the section B. The springs 28 operate to hold the section B against rotation during the releasing of the connection 10. After the connection 10 has been released, the section A may be shifted downwardly relative to the section B to cause actuation of the knives or cutters 13.

The gripping means 11 is provided to positively hold the section B against movement during the actuation of the knives 13. It is a feature of the present invention that the casing gripping means 11 is operable by a fluid pressure actuated means. The gripping means 11 includes dies 30 carried by the block 23 of the lower section B. In the particular embodiment of the invention illustrated in the drawings, there are two like dies 30 carried in diametrically opposite slots 31 in the block. The dies 30 are radially shiftable in the slots 31 and have sliding and bearing engagement with the upper and lower ends of the slots, as well as with the side walls of the slots. Gripping parts are provided on the outer ends or faces of the dies 30 to engage or bite into the inner wall of the casing C. The gripping parts 32 of the dies may be in the nature of serrations or teeth shaped to effectively grip the casing C to prevent downward movement of the section B relative to the casing and to readily disengage from the casing upon upward movement of the section B. The gripping dies 30 project inwardly into the opening 24 and their inner edges 33 are inclined downwardly and inwardly toward the longitudinal axis of the opening.

Means is provided for normally yieldingly holding the grips or dies 30 in retracted positions where they are out of engagement with the casing C. Leaf springs or spring wires 34 are carried by the dies 30 and extend through vertically elongated openings 35 in the dies. The opposite end portions of the springs 34 are slidably carried in openings at the opposite ends of the elongated openings or slots 35. Pins 36 are carried by the block 23 and extend horizontally or transversely through the openings 35. The springs 34 are bent or bowed to engage the inner sides of the pins 36 so as to normally urge and yieldingly hold the discs 30 in the retracted positions.

The fluid pressure actuated means 12 for moving the dies 30 outwardly to grip the casing C includes a shaft or stem 37 slidably mounted in the tubular member 21. The stem 37 projects upwardly from the member 21 to extend into the body opening 17. The stem 37 is adapted to be shifted downwardly through the member 21 and its lower end is shaped to co-operate with the inclined sides 33 of the dies to force the dies outwardly. The lower end portion 38 of the stem 37 is frusto-conical or tapered downwardly and inwardly. The lower end portion 38 of the stem is normally out of engagement with the dies 30, so that the springs 34 may maintain them in retracted positions until actuation of the tool.

A head 39 is mounted on the upper end of the stem 37 within the body opening 17. The head 39 is swively or rotatably mounted on the stem 37 and is adapted to be acted upon by the circulation fluid discharging downwardly through the restricted body opening 17ª. A vertical opening or socket 40 is provided in the lower end of the head to receive the upper end of the stem 37. Suitable washers 41 may be provided between the upper end of the stem 37 and the upper end of the opening 40. Means is provided to prevent displacement of the head from the stem. An annular groove 42 is provided in the stem 37, and screws 43 are threaded through openings in the head 39 to extend into the groove to hold the head against displacement. The head 12 is preferably of round cross sectional configuration, and its lower end portion is preferably cylindrical and proportioned to fit the opening 17 with suitable clearance.

The upper end portion 44 of the head is conical, having downwardly and outwardly inclined walls. The conical upper portion 44 of the head is adapted to co-operate with the cutters 13 to feed them outwardly, and is shaped so as to be effectively acted upon by the fluid discharging downwardly through the opening 17ª. A reduced guide portion 45 may be provided on the extreme upper end of the head 12. When the parts are in their normal or unactuated positions, the conical portion 44 of the head is out of engagement with the knives 13 and is directly below the discharging end of the opening 17ª so as to be acted upon by the downwardly discharged circulation fluid. A plurality of vertical slots 46 are provided in the walls of the body section A. The slots 46 are provided to carry the knives 13, as will be hereinafter described, and operate to pass or discharge the circulation fluid from the opening 17 into the casing C.

Means is provided for normally holding the head 39 and the stem 37 against downward movement relative to the body section A. A ring or sleeve 47 is arranged between the lower end of the head 39 and the upper end of the pin 19. The sleeve 47 normally supports the head 39 and its depending stem 37 on the section A. It is to be noted that the section A is rotatable relative to the head 39 and stem 37 and is also free to be shifted downwardly relative to the head 39 upon releasing of the connection 10. The head 39 is not directly connected with the section A, but is only normally supported on the section A through the sleeve 47 so that it may move independently of the section A after the releasing of the connection 10.

The invention includes means for limiting longitudinal movement of the stem 37 relative to the section B. An elongated annular groove or reduced portion 48 is provided on the stem 37 within the member 21. The uppermost screws 29 and the other like screws 50 are threaded through openings in the member 21 to project into the groove 48. The screws 29 and 50 are adapted to engage the opposite ends of the groove 48 to limit the longitudinal movement of the stem relative to the section B. The groove 48 is made of sufficient length to permit the desired travel of the stem 37 through the member 21.

The knives 13 are pivotally carried by the section A and are operable to cut through the casing C. The knives 13 are mounted in the slots 46. There may be any suitable number of slots and knives provided in the tool, there being three equally spaced knives in the embodiment illustrated in the drawings. Pins 51 pass transversely through the upper ends of the slots 46 to pivotally carry the cutting blades or knives 13. The body slots 46 occur at the tapered portion of the opening 17, and the lower ends of the cutting knives 13 normally project downwardly and inwardly into the opening 17. The opposite sides of the knives 13 preferably have sliding and bearing engagement with the opposite side walls of the slots 46. The lower edges 52 of the knives may be substantially horizontal when the knives are in the cutting position illustrated in Fig. 4 of the drawings, and may be suitably sharpened to effectively cut the casing. Pointed projections 53 are provided on the lower ends of the knives. The upper edges of the projections 53 are inclined upwardly and inwardly so that they have suitable clearance with the cut made by the cutting edges 52. When the section A is moved downwardly relative to the head 39, the knives 13 are brought into co-operation with the conical portion 44 of the head so that their lower ends are fed or swung outwardly into cutting engagement with the casing C.

Spring means is provided to normally yieldingly hold the cutting knives 13 in retracted positions within the section A. Leaf springs or spring wires 54 are provided to yieldingly hold the knives 13 in the in positions. The upper ends of the springs 54 are held in inclined openings 55 in the section A, while the lower ends of the springs extend into openings in the inner edges of the knives. The springs 54 are bowed so as to normally hold the lower ends of the knives 13 in positions where they do not project outwardly from the slots 46. The section A is intended to be rotated during the outward feeding of the knives 13 so that the knives make a circular cut in the casing C. The section A is shifted downwardly during the actuation of the cutting knives so that the knives make a circular cut through the casing that has upwardly and inwardly inclined upper walls. The knives 13 are free to retract or move inwardly from the cut made in this manner upon upward movement of the section A.

The means 14 for indicating to the operator that the knives 13 have been fully actuated is operable to cut off the flow of circulation fluid through the section A when the knives have assumed their extreme out positions. A tubular member or nipple 60 is arranged in the restricted opening 17ª. Packing 61 may be carried by the nipple to seal with the walls of the opening 17ª. The lower end of the nipple 60 may project downwardly into the main body opening 17, and a sealing face or seat 62 is provided on its lower end to co-operate with the conical upper end 44 of the head 39. The seat 62 is of the same pitch or inclination as the conical top of the head so as to effectively seal with the head and close off the lower end of the opening 17ª. Engagement of the seat 62 with the head 39 operates to limit downwardly movement of the section A relative to the section B and the head 39; and, in accordance with the invention, the nipple 60 is adjustable longitudinally in the opening 17ª so that the downwardly travel of the section A relative to the section B and the head 39 may be regulated or varied to cause the knives 13 to be fed outwardly to cut various sizes of casing.

The exterior of the nipple 60 is roughened or provided with a plurality of circultr teeth or threads to bite into the walls of the opening 17ª. A set screw 63 is threaded through an opening in the section A to clamp against the nipple 60. The set screw 63 may be employed to releasably set the nipple 60 in any desired position in the opening 17ª. The nipple 60 may be provided with a flattened part or side to receive the end of the set screw 63. It will be apparent how clamping of the set screw 63 against the nipple 60 causes the roughened exterior of the nipple to tightly grip the walls of the opening 17ª. By adjusting the nipple 60 longitudinally in the opening 17ª, the body section A may be made to have more or less downward movement relative to the head 39 so that the cutting knives 13 may project outwardly from the section A different extents before the sealing face 62 seals with the conical part 44 of the head 39.

In operation, the tool may be lowered through a casing or tubing in the manner illustrated in Fig. 1 of the drawings, and with the parts in the unactuated positions as illustrated in Figs. 2 and 3 of the drawings. When it is desired to make a cut in the casing C, the operating string S is rotated to release the connection 10. During the releasing or unthreading of the connection 10, the body section A moves downward relative to the section B and the springs 28 operate to hold the section B against movement in the casing. After the connection 10 has been released, the section A may be permitted to settle or move down relative to the section B. The circulation of fluid through the drilling string S is preferably maintained during operation of the tool; and, upon the release of the connection 10, the fluid discharging through the nipple 60 strikes or impinges against the conical head 39 to force the head and stem 37 downwardly. Downward shifting of the stem 37 brings its tapered lower end 38 into co-operation with the inner edges 33 of the dies to force the dies outwardly into gripping engagement with the casing C. In practice, the section A may move downwardly, together with the head 39 and stem 37, until the stem 37 has reached a position where the dies 30 are in tight gripping engagement with the casing, in which position the stem 37 and the head 39 are held against further downward movement. It is to be noted that there is no positive connection between the section A and the stem 37 by which the stem is caused to move downwardly with the section A so that the gripping means 11 is wholly actuated through the action of the fluid on the conical head 39 and is actuated before the cutting knives come into engagement with the casing. The section A is rotated during its downward movement to feed the knives 13 outwardly so that the knives operate to make an annular or circular cut in the casing C when fed outwardly through their engagement with the conical portion 44 of the head. As the head 39 and the stem 37 are positively held against downward movement by the gripping dies 30, downward shifting of the section A causes the inner and lower corners of the knives 13 to slidably engage the conical portion 44 of the head. Engagement by the knives 13 and the conical portion 44 of the head during downward feeding of the section A and rotation of the section A causes the knives 13 to make a flared or outwardly enlarging cut in the casing C as they shift or swing radially outward. Upon the knives 13 reaching their predetermined fully out position where they have fully cut through the casing C, the sealing face 62 of the nipple comes into engagement with the conical face 44 of the head to cut off the flow of circulation fluid through the nipple 60. When the flow of circulation fluid has been stopped in this manner, the pumps passing the fluid into the well labor or stop, and indicate to the operator that the cutters or knives 13 have been fully actuated and have cut through the casing.

If it is desired to make another cut in the casing, the pumps are shut off and the operating string S is pulled upwardly, causing the section A to shift upwardly relative to the head 30 of the section B. Upon shifting of the section A relative to the head 39 permits the knives 13 to disengage from the head and be retracted by the springs 54. As the cut made by the knives has downwardly and outwardly inclined walls, the knives 13 act to automatically pass inwardly through the slots 46 through their engagement with the walls of the cut. Continued upward movement of the section A brings the sleeve 47 into engagement with the lower side of the head 39 so that the head and stem 37 are caused to move upwardly together with the section A, releasing the dies 30 so that they are retracted by the springs 34. Still further upward movement of the section A brings the lower threads of the connection 10 against the upper thread in the nut 18, causing the section B to move upwardly together with the section A. Upon movement of the stem 37 as described above raises its tapered lower end out of engagement with the dies 30 so that the dies are free to disengage from the walls of the casing and to shift inwardly.

When it is desired to make the second cut in the casing, the circulation of fluid through the string S is resumed and the string is permitted to settle or lower somewhat so that the section A moves downwardly. The action of the circulation fluid on the head 39 causes the head and the stem 37 to move downwardly so that the dies 30 are again actuated and the operation of the tool may be repeated as described above. If it should be necessary to lower the tool below the first cut, or at any time after the connection 10 has been unscrewed, the connection may be re-engaged by holding or pulling up slightly on the section A and turning the string "S" rearward to re-thread the connection. After the connection 10 has been re-engaged the tool may be moved to any desired position and operate as set forth above.

It is to be noted that the connection 10 need not be reset for each cut to be made, as the knives 13 and the dies 30 automatically retract when the tool is drawn upwardly. The casing gripping means 11 is entirely actuated by the fluid pressure means 12 and does not depend upon springs or the like for its actuation. The means 14 is operable to automatically indicate to the operator that the tool has completed a cut so that steps may be taken to withdraw the tool or to operate it to a position to make another cut. Further, the means 14 is adjustable so that the tool may be used to cut tubing or casing of various diameters and wall thicknesses. The casing cutting is particularly simple to operate and is very dependable in its operation, as there is no danger of the dies or cutting knives binding or sticking in the casing.

Having described only a typical preferred form of the invention, I do not wish to limit myself to the specific details set forth, but wish to reserve to myself all changes and variations that may appear to those skilled in the art or fall within the scope of the following claims:

Having described my invention, I claim:

1. A tool for use in a casing including, two sections related for relative longitudinal movement, means carried by one section for gripping the casing to hold said section against movement in the casing whereby the other section may be moved longitudinally relative to it, a fluid pressure actuated member for operating the said means, and casing cutting means operated by said member upon relative longitudinal movement between the sections.

2. A tool for use in a casing including, two sections related for relative movement, a releasable connection for holding the sections against relative movement, means carried by one section to hold it against movement in the casing whereby the other section may be moved relative to it after the release of said connection, fluid pressure means for actuating said means, and a cutter operable outwardly into engagement with the casing upon relative movement between the sections.

3. A tool for use in a casing including, two sections related for relative movement, one of the sections having a fluid passage, a releasable connection for holding the sections against relative movement, means on the other section operable to grip the casing to hold said other section stationary, fluid pressure actuated means for operating the last mentioned means including a member acted upon by fluid passing through said passage, and a cutter operable upon relative movement between the sections.

4. A tool for use in a casing including, two sections related for relative movement, one of the sections having a fluid passage, a releasable connection for holding the sections against relative movement, means on the other section operable to grip the casing to hold said other section stationary, fluid pressure actuated means for operating the last mentioned means including a member acted upon by fluid passing through said passage, and a cutter operable into engagement with the casing through co-operation with said member upon relative movement between the sections.

5. A tool for use in a casing including, two sections related for relative movement, one of the sections having a fluid passage, a releasable connection for holding the sections against relative movement, means on the other section operable to grip the casing to hold said other section stationary, fluid pressure actuated means for operating the last mentioned means including a member acted upon by fluid passing through said passage, and a cutter pivotally mounted on the first mentioned section operable into engagement with the casing through co-operation with said member upon relative movement between the sections.

6. A tool for use in a casing including, two sections related for relative movement, one of the sections having a fluid passage, a releasable connection for holding the sections against relative movement, means on the other section operable to grip the casing to hold said other section stationary, fluid pressure actuated means for operating the last mentioned means including a member acted upon by fluid passing through said passage, a cutter operable into engagement with the casing upon relative movement between the sections, and means for indicating that the cutter has been actuated.

7. A tool for use in a casing including, two sections related for relative movement, one of the sections having a fluid passage, a releasable connection for holding the sections against relative movement, means on the other section operable to grip the casing to hold said other section stationary, fluid pressure actuated means for operating the last mentioned means including a member acted upon by fluid passing through said passage, a cutter operable into engagement with the casing upon relative movement between the sections, and means for indicating that the cutter has been actuated including a part on the first mentioned section adapted to engage the said member to close off said passage.

8. A tool for use in a casing including, two sections related for relative movement, one of the sections having a fluid passage, a releasable connection for holding the sections against relative movement, means on the other section operable to grip the casing to hold said other section stationary, fluid pressure actuated means for operating the last mentioned means including a member acted upon by fluid passing through said passage, a cutter carried by the first mentioned section operable into engagement with the casing through co-operation with said member upon relative movement between the sections, and a member carried by the first mentioned section to engage the said member to close off the fluid passage upon the cutter being fully actuated.

9. A tool for use in a casing including, an upper section having a fluid passage, a lower section, the sections being related for relative rotational and longitudinal movement, a cutter carried by the upper section operable into cutting engagement with the casing, a die carried by the lower section for gripping the casing to hold the lower section against movement, a member operable by the fluid in said passage upon relative longitudinal movement between the sections, and an operative connection between the member and the die, the cutter being operable through engagement with said member upon relative movement between the sections.

10. A tool for use in a casing including, an upper section having a fluid passage, a lower section, the sections being related for relative movement, a cutter carried by the upper section operable into cutting engagement with the casing, a die carried by the lower section for gripping the casing to hold the lower section against movement, a releasable screw-thread connection between the sections, a member operable downwardly by fluid passing through said fluid passage, an operative connection between the member and the die, the cutter being operable by said member upon downward movement of the upper section, and means for indicating that the cutter has been fully actuated.

11. A tool for use in a casing including, an upper section having a fluid passage, a lower section, the sections being related for relative movement, a cutter carried by the upper section operable into cutting engagement with the casing, a die carried by the lower section for gripping the casing to hold the lower section against movement, a releasable screw-thread connection between the sections, a member operable downwardly by fluid passing through said fluid passage, an operative connection between the member and the die, the cutter being operable by said member upon downward movement of the upper section, and means for indicating that the cutter has been fully actuated, said means including a part carried by the upper section to engage the said member and close the fluid passage.

12. A tool for use in a casing including, two sections related for relative longitudinal movement, one of the sections having a fluid passage, means on the other section for gripping the casing, a member operable by fluid passing through said fluid passage to actuate said means, a cutter operable outwardly through cooperation with said member upon relative movement between the sections, and a nipple on the first mentioned section to cooperate with said member and close said fluid passage upon full actuation of the cutter.

13. A tool for use in a casing including two sections related for relative longitudinal movement, one of the sections having a fluid passage, means on the other section for gripping the casing, a member operable by fluid passing through said fluid passage to actuate said means, a cutter operable outwardly through cooperation with said member upon relative movement between the sections, the extent of outward actuation of the cutter being dependent upon the amount of relative movement between sections, and a part on the first mentioned section adapted to cooperate with the member to limit relative longitudinal movement between the sections, the said part being adjustable longitudinally of the first mentioned section whereby the extent of actuation of the cutter may be varied.

14. A tool for use in a casing including, two sections related for relative longitudinal movement, one of the sections having a fluid passage, means on the other section for gripping the casing, a member operable by fluid passing through said fluid passage to actuate said means, a cutter operable outwardly through cooperation with said member upon relative movement between the sections, the extent of outward actuation of the cutter being dependent upon the amount of relative longitudinal movement between the sections, and a nipple screw-threaded to the first mentioned section operable to engage the member to limit relative movement between the section and to close said fluid passage.

IRA J. McCULLOUGH.